(12) United States Patent
Liu et al.

(10) Patent No.: US 11,341,740 B2
(45) Date of Patent: May 24, 2022

(54) OBJECT IDENTIFICATION METHOD AND OBJECT IDENTIFICATION DEVICE

(71) Applicant: BOE TECHNOLOGY GROUP CO., LTD., Beijing (CN)

(72) Inventors: Tong Liu, Beijing (CN); Xiangyang Liu, Beijing (CN); Zhiguo Zhang, Beijing (CN); Hui Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 353 days.

(21) Appl. No.: 16/481,542

(22) PCT Filed: Jan. 2, 2019

(86) PCT No.: PCT/CN2019/070027
§ 371 (c)(1),
(2) Date: Jul. 29, 2019

(87) PCT Pub. No.: WO2019/205727
PCT Pub. Date: Oct. 31, 2019

(65) Prior Publication Data
US 2021/0334533 A1    Oct. 28, 2021

(30) Foreign Application Priority Data

Apr. 28, 2018 (CN) .......................... 201810402446.5

(51) Int. Cl.
*G06V 20/00* (2022.01)
*G06T 7/254* (2017.01)
(Continued)

(52) U.S. Cl.
CPC .............. *G06V 20/00* (2022.01); *G06T 7/248* (2017.01); *G06T 7/254* (2017.01); *G06T 7/337* (2017.01);
(Continued)

(58) Field of Classification Search
CPC ..... G06K 9/00624; G06T 7/337; G06T 7/254; G06T 7/248; G06T 2207/10028;
(Continued)

(56) References Cited

U.S. PATENT DOCUMENTS

2014/0028794 A1* 1/2014 Wu ....................... H04N 5/2226
348/43
2014/0355831 A1* 12/2014 Han ......................... G06T 7/254
382/103

(Continued)

FOREIGN PATENT DOCUMENTS

CN    102831378 A    12/2012
CN    104112275 A  * 10/2014
(Continued)

OTHER PUBLICATIONS

First Office Action for Chinese Patent Application No. 201810402446.5 dated Dec. 24, 2019.
(Continued)

*Primary Examiner* — Nancy Bitar
*Assistant Examiner* — Daniella M. DiGuglielmo
(74) *Attorney, Agent, or Firm* — Calfee, Halter & Griswold LLP (57) ABSTRACT

An object identification method and an object identification device, the object identification method comprises: capturing color images and depth images that are aligned; performing motion detection on the captured color images and depth images to acquire a motion start frame and a motion end frame; comparing the motion end frame with the motion start frame in the color images to acquire a set of motion pixels; performing connected component analysis on the acquired set of motion pixels to obtain at least one connected component; and identifying an object in the at least one connected component.

11 Claims, 7 Drawing Sheets

(51) Int. Cl.
*G06T 7/33* (2017.01)
*G06T 7/246* (2017.01)
*G06V 20/52* (2022.01)
*G06V 10/26* (2022.01)

(52) U.S. Cl.
CPC .... *G06T 7/246* (2017.01); *G06T 2207/10024* (2013.01); *G06T 2207/10028* (2013.01); *G06T 2207/20021* (2013.01); *G06T 2207/20084* (2013.01); *G06T 2207/20224* (2013.01); *G06V 10/267* (2022.01); *G06V 20/52* (2022.01)

(58) Field of Classification Search
CPC . G06T 2207/20021; G06T 2207/10024; G06T 2207/20084; G06T 2207/20224; G06T 7/246; G06V 20/00; G06V 10/267; G06V 20/52
USPC .......................................................... 382/181
See application file for complete search history.

(56) References Cited

U.S. PATENT DOCUMENTS

2015/0269739 A1* 9/2015 Ho .......................... G06T 7/194
382/164

2018/0335786 A1 11/2018 Ding et al.

FOREIGN PATENT DOCUMENTS

| CN | 104112275 A | | 10/2014 |
|---|---|---|---|
| CN | 104700430 A | * | 6/2015 |
| CN | 104700430 A | | 6/2015 |
| CN | 106504074 A | * | 3/2017 |
| CN | 106778471 A | | 5/2017 |
| CN | 107613237 A | | 1/2018 |
| CN | 107862775 A | * | 3/2018 |
| CN | 107862775 A | | 3/2018 |
| CN | 108596128 A | | 9/2018 |

OTHER PUBLICATIONS

Image feature description SIFT, SURF, ORB, HOG, HAAR, LBP feature principle overview Original holy_hao Last published on Apr. 28, 2017 21:33:12 Reading No. 8730; https://blog.csdn.net/u011746554/article/details/70941268.

SVM understanding; Original viewcode Posted at Oct. 24, 2013 11:25:33 Views 109530; https://blog.csdn.net/viewcode/article/details/12840405.

* cited by examiner

500 object identification device

501 capturing member

502 detecting member

503 acquiring member

504 analyzing member

505 dividing member

506 identifying member

OBJECT IDENTIFICATION METHOD AND OBJECT IDENTIFICATION DEVICE

CROSS REFERENCE TO RELATED APPLICATIONS

The present application is a 35 U.S.C. 371 national stage application of PCT International Application No. PCT/CN2019/070027, filed on Jan. 2, 2019, which claims the benefit of Chinese Patent Application No. 201810402446.5, filed on Apr. 28, 2018, the entire disclosures of which are incorporated herein by reference.

TECHNICAL FIELD

The present disclosure relates to identification technologies, and in particular, to an object identification method and an object identification device.

BACKGROUND

In some applications, it is necessary to identify an object in an image by image identification. For example, in an application scenario of the smart shopping cart, goods in an image can be identified by capturing images to realize automatic checkout. In some monitoring scenarios, it is possible to determine whether there is an abnormality for a person or an object in the monitoring screen by capturing images.

Existing object identification methods are usually limited to grayscale, and color images themselves. Since images are susceptible to illumination, viewing angle, noise, etc., the reliability of identification in complex scenes is difficult to be guaranteed. Moreover, in a complex scene, color image division based on a single frame of image is very difficult, and an inaccurate division will reduce an accuracy of subsequent object identification.

SUMMARY

In view of problems of the related art, the present disclosure provides an object identification method and an object identification device for improving the accuracy of object identification.

According to one exemplary embodiment, an object identification method is provided, comprising:
 capturing color images and depth images that are aligned;
 performing motion detection on the captured color images and depth images to acquire a motion start frame and a motion end frame;
 comparing the motion end frame with the motion start frame in the color images to acquire a set of motion pixels;
 performing connected component analysis on the acquired set of motion pixels to obtain at least one connected component; and
 identifying an object in the at least one connected component.

In some exemplary embodiments of the object identification method, the method further comprises dividing the at least one connected component into at least one object component based on depth information of the motion end frame in the depth images; and the step of identifying an object in the at least one connected component comprises identifying an object in the at least one object component.

In some exemplary embodiments of the object identification method, the step of performing motion detection on the captured color images and depth images to acquire a motion start frame and a motion end frame comprises:
 determining, for the captured color images, whether a number of pixels whose difference in pixel values between an i-th frame and an (i−1)-th frame is greater than a first threshold exceeds a second threshold, where i is a positive integer greater than 1;
 determining, for the captured depth images, whether a number of pixels whose difference in pixel values between an i-th frame and an (i−1)-th frame is greater than a third threshold exceeds a fourth threshold;
 determining the i-th frame to be a motion frame in response to at least one of the following conditions, otherwise determining the i-th frame to be a still frame:
 (1) the number of pixels whose difference in pixel values between the i-th frame and the (i−1)-th frame of the color images is greater than the first threshold exceeds the second threshold; and
 (2) the number of pixels whose difference in pixel values between the i-th frame and the (i−1)-th frame of the depth images is greater than the third threshold exceeds the fourth threshold; and
 determining the motion start frame and the motion end frame in the color images and the depth images based on the motion frame and the still frame.

In some exemplary embodiments of the object identification method, the step of performing motion detection on the captured color images and depth images to acquire the motion start frame and the motion end frame comprises:
 determining, for the captured color images, a number X1 of pixels whose difference in pixel values between an i-th frame and an (i−1)-th frame is greater than a first threshold, where i is a positive integer greater than 1;
 determining, for the captured depth images, a number X2 of pixels whose difference in pixel values between an i-th frame and an (i−1)-th frame is greater than a third threshold;
 determining whether a sum of X1 and X2 is greater than a fifth threshold, and if so, determining the i-th frame to be a motion frame, otherwise determining the i-th frame to be a still frame; and
 determining the motion start frame and the motion end frame in the color images and the depth images based on the motion frame and the still frame.

In some exemplary embodiments of the object identification method, the step of determining the motion start frame and the motion end frame in the color images and the depth images based on the motion frame and the still frame comprises:
 determining a previous frame of a detected first motion frame as the motion start frame, and determining a N-th consecutive still frame after the first motion frame as the motion end frame, where N is a preset positive integer.

In some exemplary embodiments of the object identification method, the step of comparing the motion end frame with the motion start frame in the color images to acquire a set of motion pixels comprises:
 performing a pixel-by-pixel comparison of the motion end frame and the motion start frame in the color images to acquire a set of pixels whose difference in pixel values is greater than a sixth threshold; and
 defining the set of pixels as the set of motion pixels.

In some exemplary embodiments of the object identification method, the step of dividing the at least one connected component into at least one object component based on depth information of the motion end frame in the depth images comprises:

determining a pixel having a depth value of zero in the motion end frame in the depth images; and dividing the at least one connected component into at least one object component along the pixel having the depth value of zero.

In some exemplary embodiments of the object identification method, the step of identifying an object in the at least one object component comprises identifying an object in the at least one object component based on a depth neural network.

In some exemplary embodiments of the object identification method, the step of performing connected component analysis on the acquired set of pixels to obtain at least one connected component comprises:

performing connected component analysis on the acquired set of pixels to obtain an initial connected component; and removing a connected component that does not meet the preset condition for area or aspect ratio, or that is located inside other connected components from the initial connected component to obtain the at least one connected component.

In some exemplary embodiments of the object identification method, the value of N is dynamically set based on the capture frequency of the color images and the depth images that are aligned.

According to another exemplary embodiment, another object identification method is provided, comprising:

capturing color images and depth images that are aligned;

acquiring a start frame and an end frame in the captured color images and depth images;

comparing the end frame with the start frame in the color images to acquire a set of motion pixels;

performing connected component analysis on the acquired set of motion pixels to obtain at least one connected component;

dividing the at least one connected component into at least one object component based on depth information of the end frame in the depth images; and identifying an object in the at least one object component.

In this object identification method according to some exemplary embodiments, the step of comparing the end frame with the start frame in the color images to acquire the set of motion pixels comprises:

performing a pixel-by-pixel comparison of the end frame and the start frame in the color images to acquire a set of pixels whose difference in pixel values is greater than a sixth threshold; and defining the set of pixels as the set of motion pixels.

In this object identification method according to some exemplary embodiments, the step of dividing the at least one connected component into at least one object component based on depth information of the end frame in the depth images comprises:

determining a pixel having a depth value of zero in the end frame in the depth images; and dividing the at least one connected component into at least one object component along the pixel having the depth value of zero.

According to yet another exemplary embodiment, an object identification device is provided, comprising:

a capturing member, configured to capture color images and depth images that are aligned;

a detecting member, configured to perform motion detection on the captured color images and the depth images to acquire a motion start frame and a motion end frame;

an acquiring member, configured to compare the motion end frame with the motion start frame in the color images to acquire a set of motion pixels;

an analyzing member, configured to perform connected component analysis on the acquired set of motion pixels to obtain at least one connected component;

a dividing member, configured to divide the at least one connected component into at least one object component based on depth information of the motion end frame in the depth images; and an identifying member, configured to identify an object in the at least one object component.

In an object identification device according to some exemplary embodiments, the capturing member comprises an RGBD camera.

According to still another exemplary embodiment, a shopping cart comprising the object identification device according to some exemplary embodiments is provided.

According to yet another exemplary embodiment, a computer readable storage medium is provided having stored thereon computer readable instructions that, when executed, perform the object identification method according to some exemplary embodiments.

BRIEF DESCRIPTION OF THE DRAWINGS

The above and other features and advantages of the present disclosure will become more apparent from the detailed description of exemplary embodiments with reference to accompanying drawings. It is apparent that the drawings in the following description are only some of the embodiments of the present disclosure, and other drawings may be obtained from these drawings for those skilled in the art without creative work. In the drawings.

DETAILED DESCRIPTION OF THE DISCLOSURE

Exemplary embodiments will now be described more comprehensively with reference to the accompanying drawings. However, the exemplary embodiments can be embodied in a variety of forms and should not be construed as being limited to the embodiments set forth herein. Providing these exemplary embodiments enables the present disclosure to be comprehensive and complete, and conveys the concepts of the embodiments comprehensively to those skilled in the art. The described features, structures, or characteristics may be combined in any suitable manner in one or more embodiments. In the following description, numerous specific details are set forth to illustrate embodiments of the present disclosure more clearly. However, those skilled in the art will appreciate that the technical solution of the present disclosure may be practiced without one or more of the specific details, or other methods, components, materials, devices, steps, etc. may be employed. In other instances, well-known technical solutions are not shown or described in detail to avoid obscuring aspects of the present disclosure.

In addition, the drawings are merely schematic illustrations of the present disclosure and are not necessarily drawn to scale. The same reference numerals in the drawings denote the same or similar parts, and the repeated description thereof will be omitted.

Figure 1:
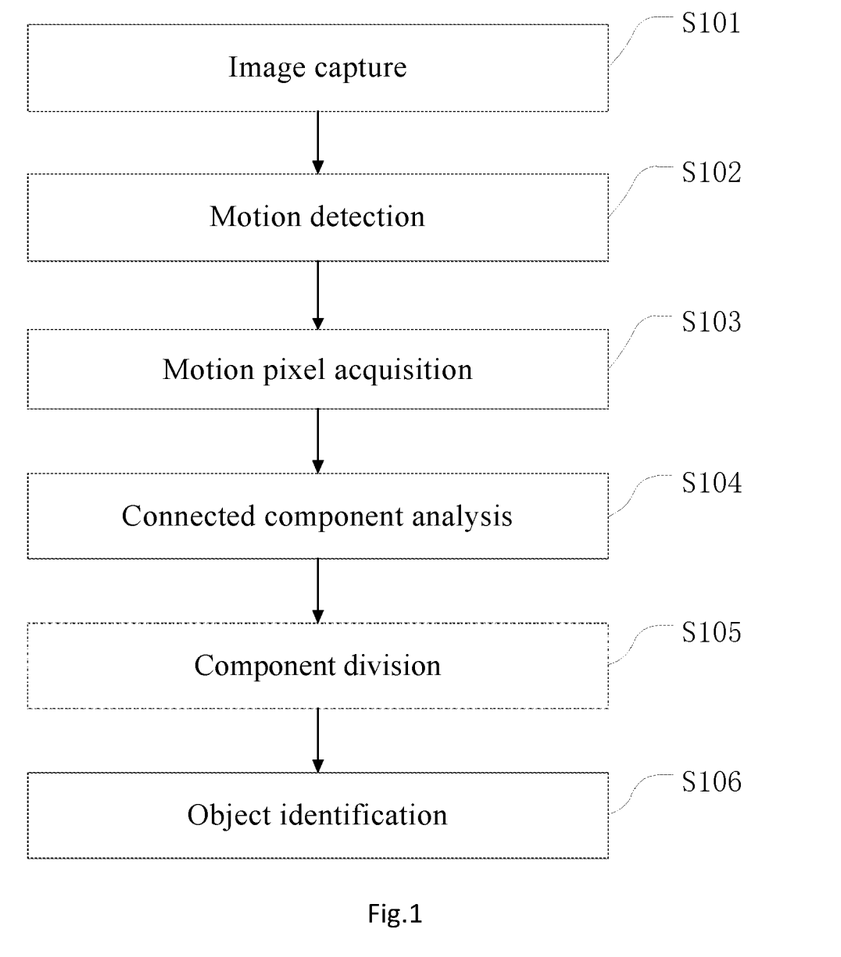
FIG. 1 shows a flow chart of an object identification method according to some exemplary embodiments.

FIG. 1 illustrates a flow chart of an object identification method according to some exemplary embodiments. An object identification method according to some exemplary embodiments may be implemented using an object identification device on a smart shopping cart in a store or supermarket, where an object refers to a target entity that is desired to be identified in an image or video, such as a person, an object (e.g. goods, license plate number, etc.). Object identification can be understood as using a theory and method in the field of image processing to identify or mark a meaningful target entity-object such as a person or an object from an image or video. An object identification method according to some exemplary embodiments shown in FIG. 1a will be described in detail below.

S101, image capture step: capturing color images and depth images that are aligned.

The object identification method according to some exemplary embodiments starts from image capturing. For example, an image capturing step S101 may be performed using an image capturer such as an RGBD camera. The RGBD camera can simultaneously acquire a color image and a depth image. The depth image is also called a range image, which refers to an image that take a distance (depth) from the image capturer to each point in the scene as a pixel value, which directly reflects a geometry of a visible surface of the object. The depth in the depth image can be calculated by the following ways. Firstly, emit infrared structured light and then receive a beam of light that is reflected back by the object, thereby calculate the distance from the camera to the object, i.e. the depth, by detecting the flight (round trip) time of the beam. The RGBD camera can work in "aligned" mode to get a color image and a depth image that are "aligned", where "aligned" means that the color image and the depth image have the same width and height, and the pixel value of the color image is in one-to-one correspondence with that of the depth image.

S102, motion detection step: performing motion detection on the captured color images and depth images to acquire a motion start frame and a motion end frame.

After the image capture step, motion detection of the color images and the depth images is required to acquire a motion start frame and a motion end frame, thereby obtaining a motion pixel or component in which the object in the images is located by comparison. In general, the degree of change of respective pixel values between adjacent frame images (e.g., color images and depth images) and the number of pixels reaching a certain degree of change (i.e., moving or changing pixels) in a video captured by a camera can be used to determine whether there is a motion (or whether the scene in the camera's field of view changes). Firstly, a threshold of the degree of change in the pixel value and a threshold number of pixels reaching the threshold of the degree of change may be set, and then whether there is motion is determined based on the threshold. For example, whether a number of pixels whose difference in pixel values between adjacent frames is greater than a predetermined first threshold is greater than a predetermined second threshold is counted in the color images and the depth images, respectively, to determine whether there is motion or change in the camera's field of view: if greater than the second threshold, the current frame is a motion frame, otherwise it is a still frame. The pixel difference threshold and the pixel number threshold can be determined experimentally.

For color images, pixel values of pixels may be represented by RGB components, or can also be represented by gray values. A pixel difference between two adjacent frames for a certain pixel in color images may refer to a difference between an RGB component or a gray value of the pixel in the current frame and an RGB component or a gray value of the pixel in the previous frame. Of course, the pixel values in color images can also be measured by other units. For depth images, pixel values of pixels in the depth images may be represented by gray values, and thus a pixel difference in depth images may refer to a difference between a gray value of the pixel in the current frame and a gray value of the pixel in the previous frame. Of course, the pixel values in depth images can also be measured by other units.

After a motion frame is detected, it can be determined that there is motion, so the previous frame of the first motion frame can be set as a motion start frame. Next, a motion end frame, that is, a frame of image after the object entering the camera's field of view, need to be acquired to obtain a component in which the object is located in the subsequent steps. More specifically, after the motion frame is detected, the next frame is continuously detected until N still frames are continuously detected. At this time, the N-th consecutive still frame can be regarded as the motion end frame. The reason to determine the end of the motion until N still frames are detected is that a complex motion or action may have a short pause, during which the motion is not completed despite being identified as a still frame. In order to avoid erroneous judgements, the completion of the action may be determined after a number (e.g., N) of consecutive still frames have been detected.

In some exemplary embodiments, N may be a preset value. For example, it may be set based on a frame rate of an image capturer used, a rate of motion or action to be detected, an experimental result, and the like. If N is set to be too small, it may cause an unfinished action to be erroneously judged as the action to be detected; if N is set to be too large, it may cause two separate actions to be judged as one action because the next action begins before N consecutive still frames being detected. Therefore, in order to make the value of N adapt to the current user behavior in real time, the value of N can be dynamically set. For example, the frame rate of the camera, or the motion law, etc. can be dynamically obtained, thereby determining the currently appropriate value of N. For example, in a smart shopping cart equipped with an item identification device, the action time for a user to put in or take out an item is usually 0.5 s, and the frame rate of the camera in the item identification device is, for example, 20 frames/second, and it is conceivable to set N to be 10. Of course, N can also be set to be other values according to the actual situation or the required detection accuracy.

S103, motion pixel set acquisition step: comparing the motion end frame with the motion start frame in the color images to acquire a set of motion pixels.

After the motion detection, a set of pixels having a pixel difference value greater than a predetermined sixth threshold are obtained by pixel-by-pixel comparison of the motion end frame and the motion start frame in the color images. Such a set of pixels can be considered as a set of pixels in which motion occurs. The purpose of acquiring a set of motion pixels is to determine a location of an object that is newly entering the field of view of the camera in the image to facilitate subsequent effective identification thereof.

S104, connected component analysis step: performing connected component analysis on the acquired set of motion pixels to obtain at least one connected component.

Connected component generally refers to a set of pixels composed of adjacent pixels with the same pixel values. Connected component analysis refers to finding out and marking each connected component in an image to identify the connected component. Connected component analysis is a common and basic method in many application fields of image analysis and processing, such as character extraction in OCR identification (license plate identification, text identification, caption identification, etc.), moving foreground target extraction in visual tracking (pedestrian intrusion detection, abandoned object detection, vision-based vehicle detection and tracking, etc.), medical image processing (extraction of target component of interest) and so on. Here, the connected component analysis method may be utilized to extract or identify at least one connected component in which the object is located from the acquired set of motion pixels.

In some exemplary embodiments, in the connected component analysis step S104, after obtaining the initial connected component by analyzing the set of motion pixels, the component in the initial connected component that is obviously abnormal may be removed. For example, a connected component does not meet the preset condition of the area (e.g. a component with too small a area), a connected component does not meet the preset condition of the aspect ratio (e.g., a component with too large a aspect ratio), or a connected component inside other connected components (this may be caused by false detection due to noise) may be removed, thereby obtaining the at least one connected component in which the object is located. This effectively reduces the number of possible connected components, that is, reduces the number of components for subsequent steps of dividing, identification, etc., and reduces processing complexity.

S106, object identification step: identifying an object in the at least one connected component.

After acquiring the connected component in which the object is located through the connected component analysis, the object in the acquired connected component can be identified in the color images. For example, an object in an object component can be identified based on a deep neural network (DNN). Specifically, the VGG16 network model can be trained by using convolution architecture for feature extraction (Caffe) to obtain an object identification model for identifying an object in the object component of the color image.

In the application scenario of the smart shopping cart, the above object identification method can be continuously executed to identify newly added or removed items after each motion (such as taking out/putting into items). All the newly added items are added to the item list, and the removed items are removed from the item list, and finally the items purchased by the user can be obtained through the item list at the end of the shopping (or the end of the image capture).

In some exemplary embodiments, various thresholds, such as the first to the sixth threshold, may be set based on a particular application scenario and actual needs.

Alternatively, as shown in FIG. 1, the object identification method according to some exemplary embodiments may further comprise a division step S105 between the analysis step S104 and the identification step S106:

Dividing the at least one connected component into at least one object component based on depth information of the motion end frame in the depth image.

In order to make the component of the object obtained in step S104 more accurate, after acquiring the connected component where the object is located, the object component may be further refined by the image division method, that is, the connected component in which the object is located is divided into at least one object component based on the depth information of the motion end frame in the depth image.

In step S106 shown in FIG. 1, since at least one connected component has been divided in the depth image by the additional step S105, the object in respective object components obtained after the division can be identified in the color image during identification. Specifically, the VGG16 network model can still be trained by using convolution architecture for feature extraction (Caffe) to obtain an object identification model for identifying an object in the object component of the color image.

In some exemplary embodiments, the step S105 may comprise: determining a pixel having a depth value of zero in the motion end frame in the depth images; and dividing the at least one connected component into at least one object component (that is, the component where the object is located, or the component where the object may exist) along the pixel having the depth value of zero. Since pixels having a depth of zero generally correspond to an edge of an object or an item in a depth image, division along these pixels may be equivalent to division along an edge of the object, so that the component of the object in color images or in the depth images can be obtained more accurately.

In some exemplary embodiments, since the color image and the depth image are aligned, that is, the coordinates of the pixels in the color image and the coordinates of the pixels in the depth image are in one-to-one correspondence, when performing the analysis of the depth image, the connected component in the depth image can be directly determined based on the coordinates of the connected component determined in the color image. That is, although the color image and the depth image are two kinds of images, since the two are aligned, once the connected component is determined in the color image, the connected component can be divided directly through the pixels having the depth value of zero without determining the connected component again in the depth image.

In the object identification method comprising the step S105, since a more accurate object component is obtained based on the depth image division, the object identification is more accurate, and the identification accuracy is higher than the identification method only based on the color image (especially the component division). In addition, after the division, the object identification is performed in the color image based on the divided components, and thus the identification accuracy is improved.

Figure 2:
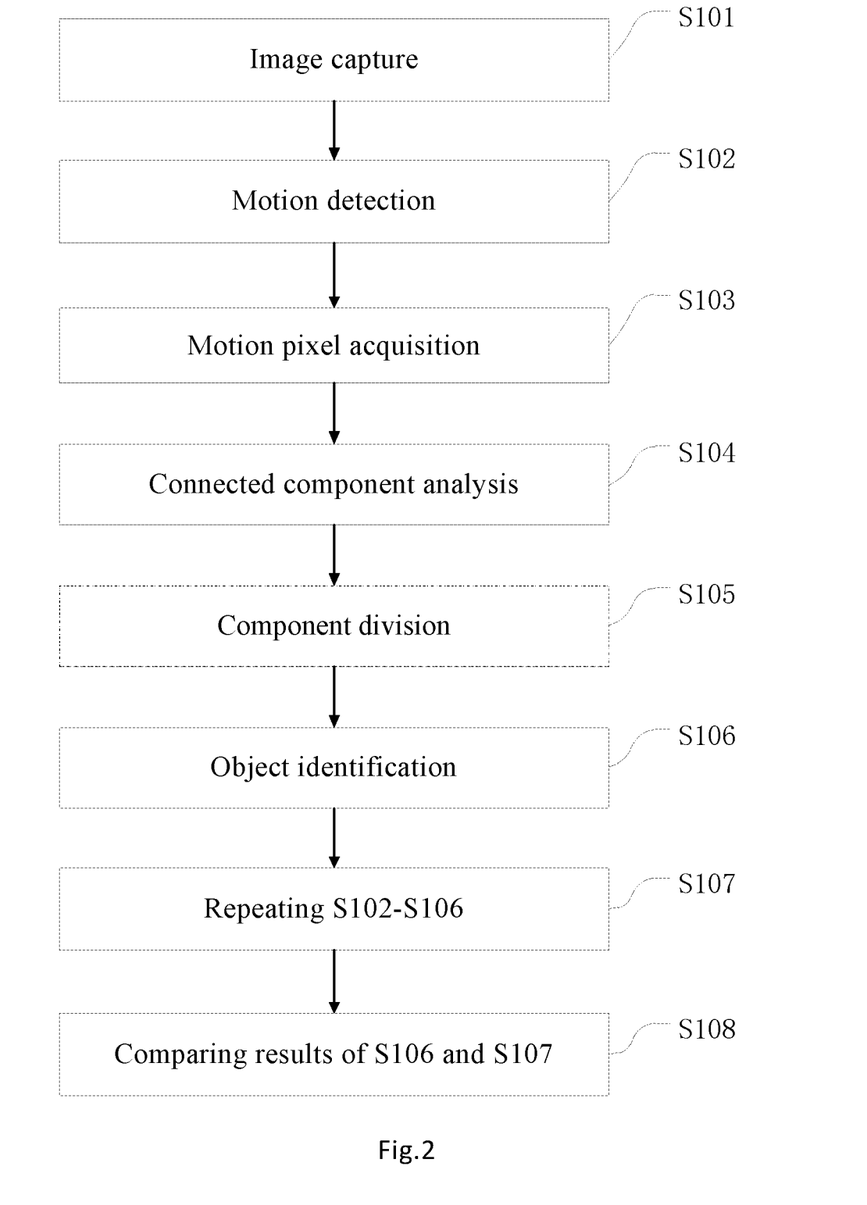
FIG. 2 shows a flow chart of an object identification method according to other exemplary embodiments.

FIG. 2 shows a flow chart of an object identification method according to other exemplary embodiments. Compared with FIG. 1, the object identification method shown in FIG. 2 further comprises the steps of:

S107, repeating steps S102-S106; and

S108, comparing the object identification results of S106 and S107.

In the application scenario of the smart shopping cart, after the object in the current motion end frame is identified, the steps of motion detection, motion pixel set acquisition, connected component analysis, component division, and object identification are repeatedly performed, thereby identifying the object in the next motion end frame. The objects in the two adjacent motion end frames can then be compared to determine the currently added or removed item. The currently added item is added to the item list, or the removed item is removed from the item list. Through the comparison step, it is possible to determine which items have been placed into the shopping cart by a user during a certain period of time, or which items have been taken out of the shopping cart. Based on the comparison result, and in conjunction with the item list in the shopping cart in the history information, the items comprised in the current item list can be determined.

Figure 3A:
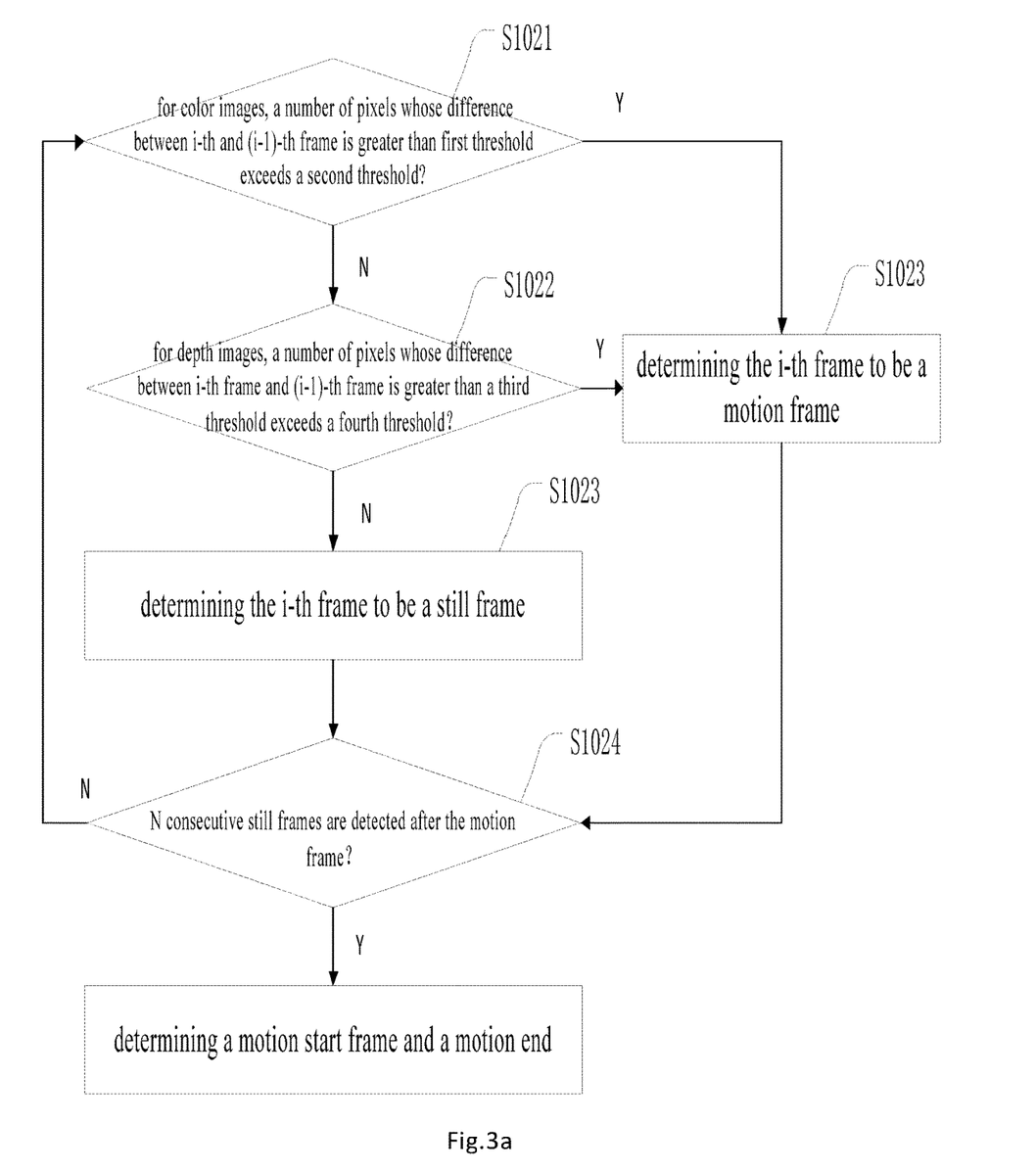
FIGS. 3a and 3b show flow charts of motion detection steps of some exemplary embodiments and other embodiments of an object identification method, respectively.

FIG. 3a shows a flow chart of motion detection steps in some exemplary embodiments of an object identification method. As shown in FIG. 3a, the motion detection step S102 shown in FIG. 1 comprises the following steps:

S1021, determining, for the captured color images, whether a number of pixels whose difference in pixel values between an i-th frame and an (i−1)-th frame is greater than the first threshold exceeds a second threshold, where i is a positive integer greater than 1;

S1022, determining, for the captured depth images, whether a number of pixels whose difference in pixel values between an i-th frame and an (i−1)-th frame is greater than a third threshold exceeds a fourth threshold; and S1023, determining the i-th frame to be a motion frame in response to at least one of the following conditions, otherwise determining the i-th frame to be a still frame:

(1) the number of pixels whose difference in pixel values between the i-th frame and the (i−1)-th frame of the color images is greater than the first threshold exceeds the second threshold; and (2) the number of pixels whose difference in pixel values between the i-th frame and the (i−1)-th frame of the depth images is greater than the third threshold exceeds the fourth threshold;

As shown in step S1023 shown in FIG. 3a, only when the number of pixels whose difference in pixel values between the i-th frame and the (i−1)-th frame of the color images is greater than the first threshold does not exceed the second threshold and the number of pixels whose difference in pixel values between the i-th frame and the (i−1)-th frame of the depth images is greater than the third threshold does not exceed the fourth threshold, the i-th frame may be determined to be a still frame.

S1024, determining a motion start frame and a motion end frame in the color images and the depth images based on the motion frame and the still frame, that is, determining a previous frame of the detected first motion frame as a motion start frame, and determining the N-th consecutive still frame after the first motion frame as the motion end frame.

Figure 3B:
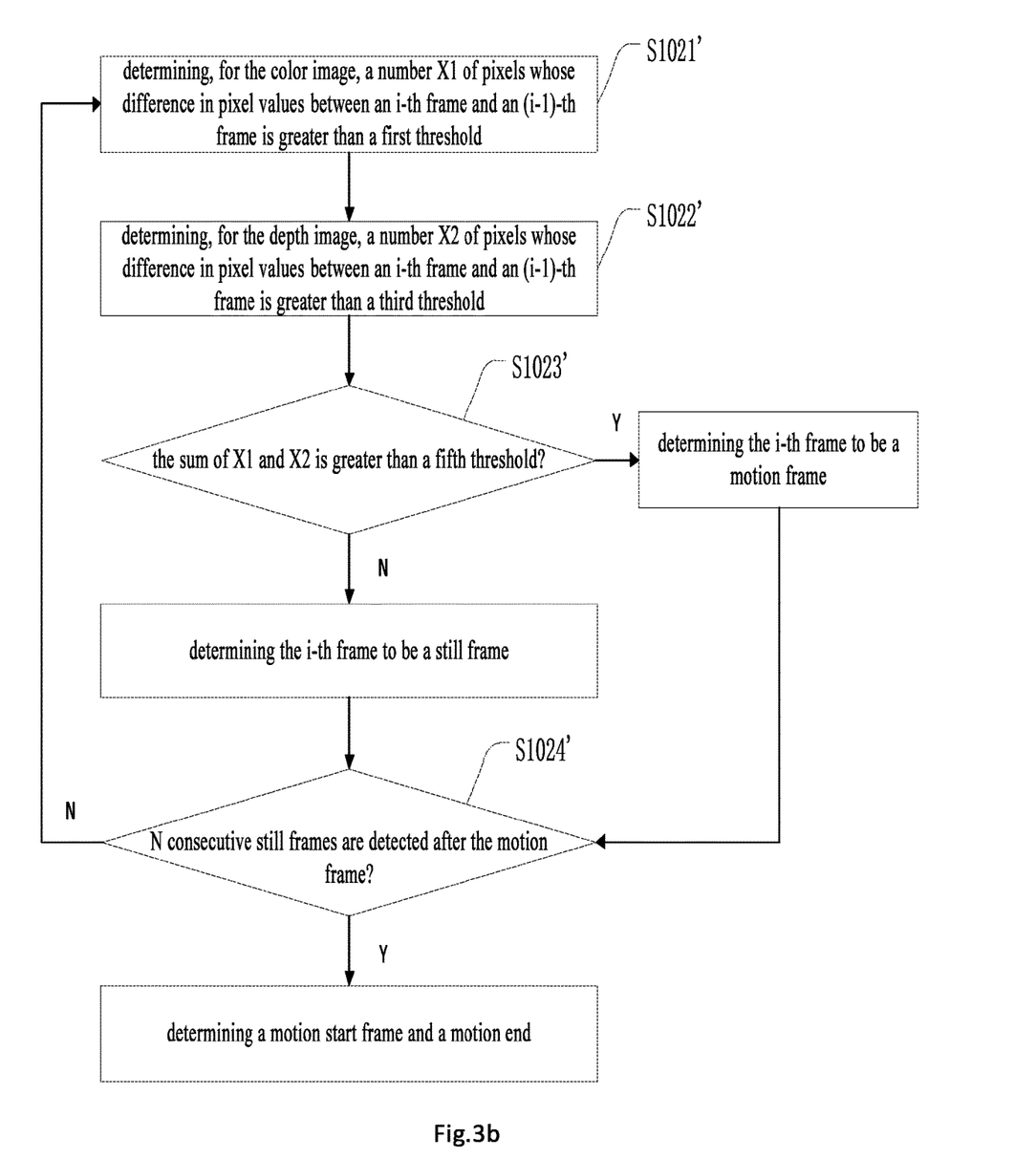

FIG. 3b shows a flow chart of motion detection steps in an object identification method according to other exemplary embodiments. As shown in FIG. 3b, the motion detecting step S102 shown in FIG. 1 may also comprise steps S1021'-S1024'. As can be seen from a comparison, the steps S1021'-S1023' for detecting the motion frame and still frame in FIG. 3b are different from FIG. 3a, and the remaining steps are the same as FIG. 3a. As an alternative, FIG. 3b employs a method of determining motion frames and still frames by determining whether the sum of the number of pixels whose pixel difference is greater than a threshold in the color image and the depth image is greater than another threshold.

Specifically, the motion detection step in the object identification method according to other exemplary embodiments shown in FIG. 3b comprises:

S1021', determining, for the captured color image, a number X1 of pixels whose difference in pixel values between an i-th frame and an (i−1)-th frame is greater than a first threshold, where i is a positive integer greater than 1;

S1022', determining, for the captured depth image, a number X2 of pixels whose difference in pixel values between an i-th frame and an (i−1)-th frame is greater than a third threshold;

S1023', determining whether the sum of X1 and X2 is greater than a fifth threshold, and if so, determining the i-th frame to be a motion frame, otherwise determining the i-th frame to be a still frame; and S1024', determining a motion start frame and a motion end frame in the color images and the depth images based on the motion frame and the still frame, that is, determining a previous frame of the detected first motion frame as a motion start frame, and determining the N-th consecutive still frame after the first motion frame as the motion end frame.

The object identification method according to some exemplary embodiments may be applied not only to an application scenario of a smart shopping cart but also to other object identification scenarios, such as monitoring scenarios. By providing RGBD cameras in a monitoring scenario, the identification method provided by the present disclosure can also be used to realize high-precision object identification.

The method proposed in the present disclosure combines depth image information with two-dimensional image information to construct a joint feature that expresses richer information, which makes up for the deficiency of using only image features and improves identification accuracy. Specifically, in the present disclosure, instead of identifying only based on a color image, a more accurate object component is obtained by the determination of a set of motion pixels, the analysis of connected components, the division based on depth images, and the like based on a combination of depth images and color images. Therefore, compared with an identification method only based on color image (comprising motion detection and component division), the object identification method in the present disclosure is more accurate and the identification precision is higher. In addition, after the division, the present disclosure performs object identification in the color image based on the divided components, thus improving the identification precision.

Figure 4:
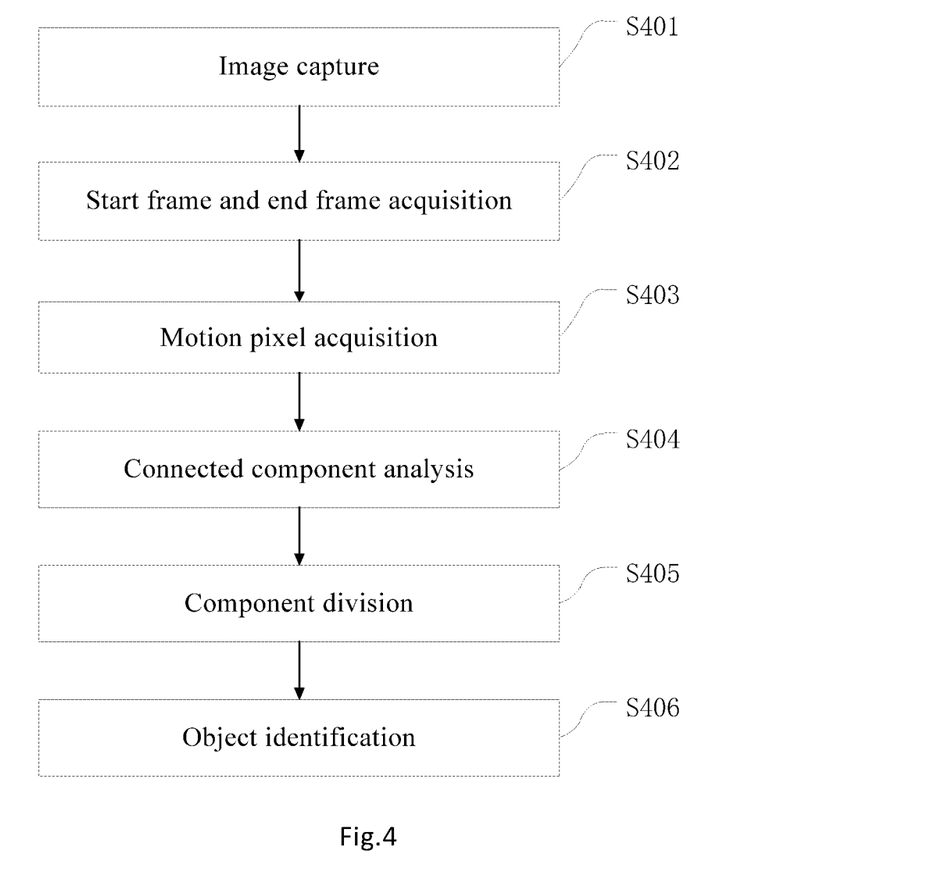
FIG. 4 shows a flow chart of an object identification method according to some exemplary embodiments.

FIG. 4 shows a flow chart of an object identification method according to other exemplary embodiments. As shown in FIG. 4, the object identification method comprises:

S401, capturing color images and depth images that are aligned;

S402, acquiring a start frame and an end frame in the captured color images and depth images;

S403, comparing the end frame with the start frame in the color images to acquire a set of motion pixels;

S404, performing connected component analysis on the acquired set of motion pixels to obtain at least one connected component;

S405, dividing the at least one connected component into at least one object component based on depth information of the end frame in the depth images; and S406, identifying an object in the at least one object component.

As can be seen from comparison with FIG. 1, the object identification method shown in FIG. 4 is the same as that of FIG. 1 except for steps S402 and S403. As described above, the object identification method shown in FIG. 1 is mainly used to acquire motion (each individual motion, for example, placing the item into the shopping cart each time) pixels by comparing the captured images (comprising depth images and color images) frame by frame to enable identification of an object that is newly entered into the camera's field of view, such as items newly added to the smart shopping cart. The object identification method shown in FIG. 4, as shown in steps S404 and S405, achieves the identification of all objects after the end of the entire motion process (the entire shopping process, not a single putting in/taking out action) mainly by comparing the start frame and the end frame of the captured images (for example, image frames at the start and end of the shopping). In other words, FIG. 4 is substantially the same in principle of identification as compared with FIG. 1, except that the method of FIG. 4 focuses on the identification of the entire motion result. Therefore, the method of FIG. 4 only needs to compare the first frame of images at the beginning of the acquisition with the last frame of images at the end of the acquisition, without having to perform comparison frame by frame as in FIG. 1. As described above, the object identification method according to some exemplary embodiments as shown in FIG. 4 can realize the identification of all objects after the entire motion process by only comparing two frames. For example, in the smart shopping cart scenario, for the problem of automatically identifying all the items in the shopping cart at the end of one shopping, as described above, for the method of FIG. 1, it is required to compare the items that are placed in and taken out each time frame by frame, and finally obtain the item list by way of aggregation. While in the method of FIG. 4, the object identification device only needs to capture the images at the start and end of shopping, and can compare the two to obtain the items selected by the shopper, so that the calculation can be significantly reduced, thereby achieving automatic identification and checkout of the items.

Figure 5:
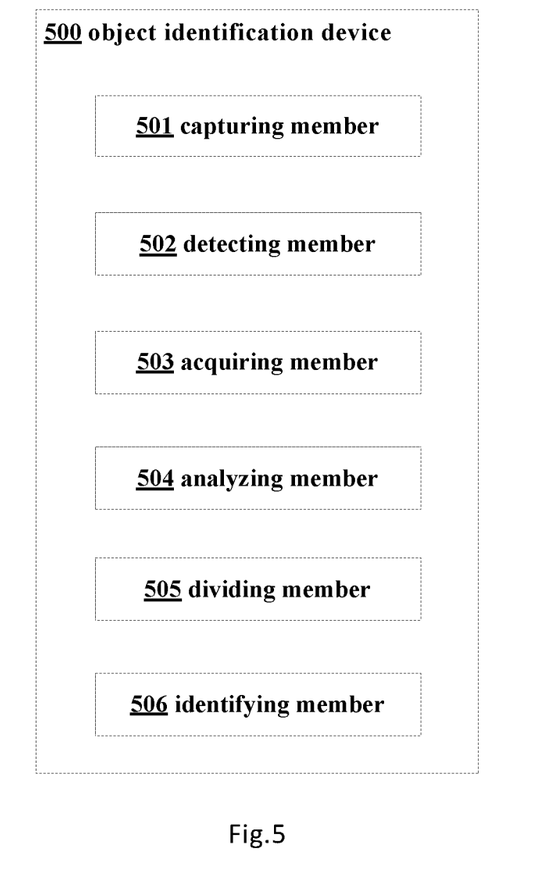
FIG. 5 shows a block diagram of an object identification device according to some exemplary embodiments.

FIG. 5 shows a block diagram of an object identification device according to some exemplary embodiments. As described above, the object identification method according to exemplary some embodiments can be implemented by an object identification device similar to that shown in FIG. 5. As shown in FIG. 5, the identification device 500 comprises:

a capturing member 501, configured to capture color images and depth images that are aligned;

a detecting member 502, configured to perform motion detection on the captured color images and the depth images to acquire a motion start frame and a motion end frame;

an acquiring member 503, configured to compare the motion end frame with the motion start frame in the color images to obtain a set of motion pixels;

an analyzing member 504, configured to perform connected component analysis on the acquired set of motion pixels to obtain at least one connected component;

a dividing member 505, configured to divide the at least one connected component into at least one object component based on depth information of the motion end frame in the depth images; and an identifying member 506, configured to identify an object in the at least one object component.

Figure 6:
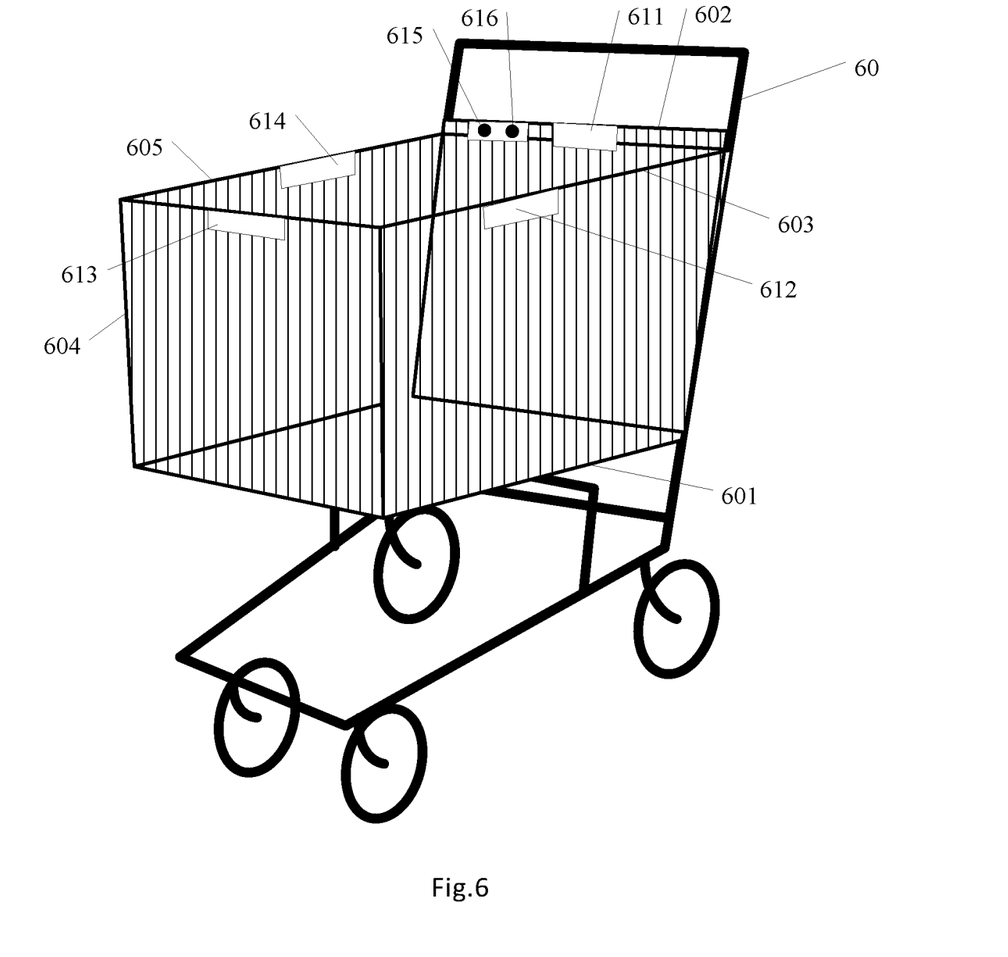
FIG. 6 shows a structural schematic diagram of a smart shopping cart comprising an object identification device according to some exemplary embodiments.

FIG. 6 shows a schematic structural diagram of a smart shopping cart comprising an object identification device according to some embodiments of the present disclosure.

A smart shopping cart is a shopping cart used in unmanned supermarkets. Since there is no manual cashier in the unmanned supermarket, it is necessary to identify the items placed in the shopping cart by the user (i.e., an example of "object" in the present disclosure) through the smart shopping cart, so that the amount of money the user needs to pay is determined based on the identified items before the user exits the supermarket. Although not shown, the shopping cart may also comprise a shopping basket, shopping bag, shopping checkout device, or other shopping device.

As shown in FIG. 6, the shopping cart may comprise a body 60 and object identification devices 611-616 disposed on the body 60 according to some embodiments of the present disclosure. The body 60 can comprise a bottom surface 601 and four side surfaces, i.e. a first side surface 602, a second side surface 603, a third side surface 604, and a fourth side surface 605. The first side surface 602 and the third side surface 604 are opposed to each other, and the second side surface 603 and the fourth side surface 605 are opposed to each other.

As shown in FIG. 6, object identification devices 611-616 can comprise at least one camera 611-614 and a memory 615 and a processor 616. As shown, the first camera 611 is disposed on a side of the first side surface 602 adjacent to the third side surface 604, and the second camera 612 is disposed on a side of the second side surface 603 adjacent to the fourth side surface 605, the third camera 613 is disposed on a side of the third side surface 604 adjacent to the first side surface 602, the fourth camera 614 is disposed on a side of the fourth side surface 605 adjacent to the second side surface 603. The four cameras can acquire depth images and color images of the object or item to be identified from different shooting angles. It should be understood by those skilled in the art that the number of cameras comprised in the object identification device is not limited to 4, and an appropriate number can be selected according to the identification precision and the specific application scenario. Cameras 611-614 may be RGBD cameras 611-614 for simultaneous acquisition of color images and depth images. In a smart shopping cart, the position and angle of the RGBD cameras 611-614 are typically adjustable to enable them to capture scenes throughout the shopping cart.

As shown in FIG. 6, the memory 615 and the processor 616 may be integrally provided and disposed on one side of the body 601. In addition, the memory 615 and the processor 616 may also be disposed on the bottom surface 601 of the body 60, although not shown. The memory 615 stores computer program instructions that are executable on the processor. The processor 616 can be, for example, an embedded system with data analysis and processing, computing capability for executing computer program instructions stored in memory to implement the object identification methods described herein.

Although not shown, the object identification device may also comprise various input devices (e.g., user interfaces, keyboards, etc.), various output devices (e.g., speakers, etc.), and a display device.

In fact, in the object identification device shown in FIG. 6, the cameras 611-614 are equivalent to the capturing member 501 shown in FIG. 5, and the memory 615 and the processor 616 are equivalent to the remaining members 502-506 shown in FIG. 5. The cameras 611-614 are responsible for capturing color images and depth images of objects (items) within the shopping cart, while the memory 615 and the processor 616 implement object identification in the images through a series of data analysis, processing, and calculation operations, such as motion detection, motion pixel acquisition, connected component analysis, connected component division, object component identification based on the captured images.

The memory can be implemented in any type of volatile or non-volatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

Some exemplary embodiments provide a computer readable storage medium having stored thereon a computer program that, when executed, implements an object identification method according to some embodiments of the present disclosure.

In the description of the present specification, the descriptions of the terms "exemplary embodiments", "one embodiment", "some embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Moreover, the terms "first" and "second" are used for descriptive purposes only and are not to be construed as indicating or implying a relative importance or implicitly indicating the number of technical features. Thus, features defining with "first" or "second" may comprise at least one of the features, either explicitly or implicitly. In the description of the present disclosure, the meaning of "a plurality" is at least two, such as two, three, etc., unless specifically defined otherwise.

Any process or method description in the flowcharts or otherwise described herein can be understood to represent a module, segment or portion of code comprising one or more executable instructions for implementing the steps of a custom logic function or process. And the scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer-readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

It should be noted that, in the claims, the use of the verb "comprising/comprise" and its variants does not exclude the presence of elements or steps not recited in the claims, and the wording "a" or "an" does not exclude a plurality.

While the disclosure has been shown and described with respect to the specific embodiments of the present disclosure, it is apparent to those skilled in the art that several variations and modifications may be made without departing from the disclosure. All such variations and modifications are intended to be comprised within the scope of the claims of the disclosure, as fall within the true spirit and scope of this disclosure.

It should be noted that although several modules or units of device for action execution are mentioned in the detailed description above, such division is not mandatory. Indeed, according to embodiments of the present disclosure, the features and functions of two or more modules or units described above may be embodied in one module or unit. Conversely, the features and functions of one of the modules or units described above may be embodied by means of being further divided into multiple modules or units.

The invention claimed is:

1. An object identification method comprising:
capturing color images and depth images that are aligned;
performing motion detection on the captured color images and the depth images to acquire a motion start frame and a motion end frame;
comparing the motion end frame with the motion start frame in the color images to acquire a set of motion pixels;

performing connected component analysis on the acquired set of motion pixels to obtain at least one connected component;

identifying an object in the at least one connected component;

dividing the at least one connected component into at least one object component based on depth information of the motion end frame in the depth images;

wherein the identifying an object in the at least one connected component comprises identifying the object in the at least one object component, wherein the performing motion detection on the captured color images and the depth images to acquire the motion start frame and the motion end frame comprises:

determining, for the captured color images, whether a number of pixels whose difference in pixel values between an i-th frame and an (i−1)-th frame is greater than a first threshold exceeds a second threshold, where i is a positive integer greater than 1;

determining, for the captured depth images, whether a number of pixels whose difference in pixel values between an i-th frame and an (i−1)-th frame is greater than a third threshold exceeds a fourth threshold;

determining the i-th frame to be a motion frame in response to at least one of the following conditions, otherwise determining the i-th frame to be a still frame:

(1) the number of pixels whose difference in pixel values between the i-th frame and the (i−1)-th frame of the color images is greater than the first threshold exceeds the second threshold; and (2) the number of pixels whose difference in pixel values between the i-th frame and the (i−1)-th frame of the depth images is greater than the third threshold exceeds the fourth threshold; and determining the motion start frame and the motion end frame in the color images and the depth images based on the motion frame and the still frame, or the performing motion detection on the captured color images and the depth images to acquire the motion start frame and the motion end frame comprises:

determining, for the captured color images, a number X1 of pixels whose difference in pixel values between an i-th frame and an (i−1)-th frame is greater than a first threshold, where i is a positive integer greater than 1;

determining, for the captured depth images, a number X2 of pixels whose difference in pixel values between an i-th frame and an (i−1)-th frame is greater than a third threshold;

determining whether a sum of X1 and X2 is greater than a fifth threshold, and if so, determining the i-th frame to be a motion frame, otherwise determining the i-th frame to be a still frame; and determining the motion start frame and the motion end frame in the color images and the depth images based on the motion frame and the still frame.

2. The method of claim 1, wherein the determining the motion start frame and the motion end frame in the color images and the depth images based on the motion frame and the still frame comprises:

determining a previous frame of a detected first motion frame as the motion start frame, and determining a N-th consecutive still frame after the first motion frame as the motion end frame, where N is a preset positive integer.

3. The method of claim 1, wherein the comparing the motion end frame with the motion start frame in the color images to acquire the set of motion pixels comprises:

performing a pixel-by-pixel comparison of the motion end frame and the motion start frame in the color images to acquire a set of pixels whose difference in pixel values is greater than a sixth threshold; and defining the set of pixels as the set of motion pixels.

4. The method of claim 1, wherein the dividing the at least one connected component into at least one object component based on depth information of the motion end frame in the depth images comprises:

determining a pixel having a depth value of zero in the motion end frame in the depth images; and dividing the at least one connected component into at least one object component along the pixel having the depth value of zero.

5. The method of claim 1, wherein the identifying the object in the at least one object component comprises identifying the object in the at least one object component based on a depth neural network.

6. The method of claim 1, wherein the performing connected component analysis on the acquired set of pixels to obtain at least one connected component comprises:

performing connected component analysis on the acquired set of pixels to obtain an initial connected component; and removing a connected component that does not meet the preset condition for area or aspect ratio, or that is located inside other connected components from the initial connected component to obtain the at least one connected component.

7. The method of claim 2, wherein the N is dynamically set based on a capture frequency of the color images and the depth images that are aligned.

8. A non-transitory computer readable storage medium having stored thereon computer readable instructions that, when executed, perform the method of claim 1.

9. An object identification device comprising:

a capturing member, configured to capture color images and depth images that are aligned;

a detecting member, wherein the detecting member is configured to:

determine, for the captured color images, whether a number of pixels whose difference in pixel values between an i-th frame and an (i−1)-th frame is greater than a first threshold exceeds a second threshold, where i is a positive integer greater than 1, determine, for the captured depth images, whether a number of pixels whose difference in pixel values between an i-th frame and an (i−1)-th frame is greater than a third threshold exceeds a fourth threshold, determine the i-th frame to be a motion frame in response to at least one of the following conditions, otherwise determine the i-th frame to be a still frame:

(1) the number of pixels whose difference in pixel values between the i-th frame and the (i−1)-th frame of the color images is greater than the first threshold exceeds the second threshold and (2) the number of pixels whose difference in pixel values between the i-th frame and the (i−1)-th frame of the depth images is greater than the third threshold exceeds the fourth threshold, and determine a motion start frame and a motion end frame in the color images and the depth images based on the motion frame and the still frame, or wherein the detecting member is configured to:
- determine, for the captured color images, a number X1 of pixels whose difference in pixel values between an i-th frame and an (i−1)-th frame is greater than a first threshold, where i is a positive integer greater than 1;
- determine, for the captured depth images, a number X2 of pixels whose difference in pixel values between an i-th frame and an (i−1)-th frame is greater than a third threshold;
- determine whether a sum of X1 and X2 is greater than a fifth threshold, and if so, determine the i-th frame to be a motion frame, otherwise determine the i-th frame to be a still frame; and
- determine a motion start frame and a motion end frame in the color images and the depth images based on the motion frame and the still frame;

an acquiring member, configured to compare the motion end frame with the motion start frame in the color images to acquire a set of motion pixels;

an analyzing member, configured to perform connected component analysis on the acquired set of motion pixels to obtain at least one connected component;

a dividing member, configured to divide the at least one connected component into at least one object component based on depth information of the motion end frame in the depth images; and an identifying member, configured to identify an object in the at least one object component.

10. The object identification device of claim 9, wherein the capturing member comprises an RGBD camera.

11. A shopping cart comprising the object identification device according to claim 9.

* * * * *